(12) United States Patent
Teofrasti et al.

(10) Patent No.: US 7,754,292 B2
(45) Date of Patent: Jul. 13, 2010

(54) MULTILAYER INTERMEDIATE PRODUCT FOR THE PREPARATION OF ARTIFICIAL LEATHER HAVING A SUEDE-LIKE APPEARANCE AND PREPARATION METHOD THEREOF

(75) Inventors: Omar Teofrasti, Milan (IT); Eraldo Spila, Milan (IT); Carmine Carlo Ammirati, Terni (IT)

(73) Assignee: Alcantara S.p.A., Milan (IT)

( * ) Notice: Subject to any disclaimer, the term of this patent is extended or adjusted under 35 U.S.C. 154(b) by 749 days.

(21) Appl. No.: 11/468,121

(22) Filed: Aug. 29, 2006

(65) Prior Publication Data

US 2007/0066173 A1 Mar. 22, 2007

(30) Foreign Application Priority Data

Aug. 31, 2005 (IT) .......................... MI2005A1616

(51) Int. Cl.
  *B05D 1/18* (2006.01)
  *B05D 7/04* (2006.01)
  *B29C 65/42* (2006.01)
  *B29C 65/02* (2006.01)

(52) U.S. Cl. ................. 427/434.2; 427/430.1; 156/182; 156/308.2; 156/327

(58) Field of Classification Search .................... 428/91, 428/904; 427/430.1, 434.2; 442/59, 63, 442/64, 268, 304, 381
See application file for complete search history.

(56) References Cited

U.S. PATENT DOCUMENTS

| | | | |
|---|---|---|---|
| 3,531,368 A | | 9/1970 | Okamoto et al. |
| 3,716,614 A | | 2/1973 | Okamoto et al. |
| 4,147,574 A | * | 4/1979 | Setsuie et al. ............... 156/62.4 |
| 4,368,227 A | * | 1/1983 | Setsuie et al. .................. 428/91 |
| 4,519,804 A | * | 5/1985 | Kato et al. ....................... 8/485 |
| 4,525,169 A | * | 6/1985 | Higuchi et al. .................. 8/485 |
| 5,112,421 A | | 5/1992 | Honda et al. |
| 5,256,429 A | * | 10/1993 | Honda et al. ................. 442/189 |
| 5,484,646 A | * | 1/1996 | Mann .......................... 428/198 |
| 6,451,716 B1 | * | 9/2002 | Sasaki et al. ................... 442/77 |
| 6,835,677 B2 | * | 12/2004 | McCabe et al. ............. 442/149 |
| 7,282,253 B2 | * | 10/2007 | Marini et al. ............. 428/195.1 |
| 7,484,277 B2 | * | 2/2009 | Tanaka et al. ................. 28/107 |
| 2005/0249931 A1 | * | 11/2005 | Utsumi ........................ 428/218 |
| 2007/0066173 A1 | * | 3/2007 | Teofrasti et al. ............. 442/346 |
| 2008/0293316 A1 | * | 11/2008 | Hwang et al. .................. 442/60 |

FOREIGN PATENT DOCUMENTS

| | | | |
|---|---|---|---|
| EP | 0584511 B | | 3/1999 |
| JP | 61207674 A | * | 9/1986 |
| JP | 62110991 A | * | 5/1987 |
| JP | 2002294570 A | * | 10/2002 |

* cited by examiner

*Primary Examiner*—Cheryl Juska
(74) *Attorney, Agent, or Firm*—Pearne & Gordon LLP

(57) ABSTRACT

In one embodiment, a process is disclosed for the preparation of a multilayer intermediate product impregnated with polyurethane that is useful for the production of soft synthetic leather having enhanced mechanical resistance. The process comprises the steps of: a. producing a microfibrous nonwoven intermediate product that includes microfibers of one or more polymers selected from the group consisting of polyethylene terephthalate, polytrimethylene terephthalate, polybutylene terephthalate, polyacrylonitrile, and polyamide; b. producing an intermediate multilayer product by adhesive coupling, the intermediate multilayer product including at least one layer of the non-woven microfibrous intermediate product and at least one layer of a reinforcing textile product; and c. impregnating the multilayer intermediate product with one or more polyurethane solutions, thereby obtaining a multilayer intermediate product impregnated with polyurethane.

18 Claims, No Drawings

MULTILAYER INTERMEDIATE PRODUCT FOR THE PREPARATION OF ARTIFICIAL LEATHER HAVING A SUEDE-LIKE APPEARANCE AND PREPARATION METHOD THEREOF

STATEMENT REGARDING FEDERALLY SPONSORED RESEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND OF THE INVENTION

1. Field of the Invention

The present invention relates to a multilayer intermediate product impregnated with polyurethane, useful for the preparation of high quality artificial leather that has a suede-like appearance and that is soft, highly formable, and characterized by an enhanced mechanical resistance. The present invention also refers to a process for obtaining the above-mentioned multilayer intermediate product and the final suede-like leather deriving from said intermediate product. Typical uses of said artificial leather are the coverings of padded furniture, car interiors, and car seats.

2. Description of Related Art

Synthetic artificial leathers having a suede-like appearance are known in the art and are characterized by a surface having a high density of microfiber and a matrix capable of binding the microfiber structure.

The microfibers forming these types of materials are typically polyester- and/or polyamide-based, and the binding matrix is typically a polyurethane.

The binder not only holds the microfibers forming the non-woven fabric, but may also increase the mechanical properties and tear resistance of the composite structure. At the same time, the binder has a negative effect on softness and formability. Accordingly, the amount of binder typically used in high quality artificial leather is included within a range that prevents such a negative effect from being excessively pronounced.

Processes for manufacturing high quality artificial leather with a suede-like appearance are disclosed in patents EP0584511, U.S. Pat. No. 3,531,368 and U.S. Pat. No. 3,716,614, and can be summarized as follows:

1. Spinning of a bi-component fiber of the "sea-island" type, in which the "island" consists of polyester and/or polyamide and the "sea" consists of a polymer that does not mix with the island component and that can be dissolved in suitable solvents of the organic or inorganic type. The microfibers obtained after the dissolution of the sea component typically have counts lower than 0.5 den.

2. Preparing a felt characterized by predefined density and unit weight values, through a mechanical needling process that interfaces the microfibers obtained in step 1 with each other.

3. Impregnating the felt with a binder capable of holding the "islands" during the subsequent elimination phase of the "sea" component. This binder, which also has the function of adequately reinforcing the felt, allowing immersion in the solvent used for eliminating the "sea", can be of two different types. The first type is typically based on polyvinyl alcohol, to be removed in a subsequent phase of the process, and the second type is typically based on a polyurethane which, even after the subsequent phases of the process, remains partially or totally in the final compound. The intermediate product obtained from this step is identified as "SR".

4. Dissolving the "sea" component in a suitable organic solvent (normally trichloro ethylene) or an inorganic solvent (an acid, a basic aqueous solution, or simply hot water) to generate a microfibrous material. The intermediate product obtained from this step is identified as "D".

5. Impregnating the above-mentioned microfibrous material with a solution of polyurethane (PU) in organic solvents (dimethyl formamide, or DMF). Alternatively, such an impregnation can be performed with polyurethane in emulsion or aqueous dispersion.

6. Eliminating of the binder used in step 3 (if that binder is not PU). The intermediate product obtained from this step is identifies as "IE".

7. Dividing the bi-component laminate ("island" component+PU) into two equal parts by means of a longitudinal cut parallel to the surfaces.

8. Surface grinding by means of suitable treatment with abrasive paper, to provide the structure with a suede-like appearance.

9. Final dyeing of the product.

One of the expedients often used for widening the application range of artificial suede-like leather is combining the same with various kinds of supports capable of making the material compatible with applications requiring a higher mechanical resistance and/or different characteristics of formability, body, etc.

The simplest and most widely-used method for combining the microfibrous substrates with the different supports is to couple them with textile supports, by using suitable adhesives, after the dyeing process. Dyeing typically precedes coupling with various supports because it is difficult to identify adhesives, which can resist the severe process conditions used for dyeing artificial leather of the suede-like type and which, at the same time, allow a sufficient softness of the product to be preserved.

Because of this limitation, it is the impossible to obtain a final product having both sides dyed in the same dyeing process, thus characterized by a more or less pronounced similarity in the appearance of the two surfaces.

These differences are also due to the common use, as supports, of materials having a significantly different structure from that of the suede-like surface. Usually, in order to give the product the physico-mechanical characteristics necessary for the different applications, the supports are various types of textile structures having a visual appearance which is extremely different from that of the microfibrous surface with a non-woven structure.

Another method used for effectively combining the microfibrous substrates with the different supports used and for overcoming the above-mentioned drawbacks is to "bind" the various layers in an operating phase, which is "upstream" of the dyeing process, without making use of the above-mentioned adhesives. A technology of this type is disclosed in U.S. Pat. Nos. 4,368,227 and 5,112,421. Both patents teach the use of "multilayer" structures consisting of a combination of a microfibrous non-woven fabric with a traditional fabric or knitted fabric.

In these patents, the linkage between the various layers of the composite product is provided by interlacing the fibers, forming the same layers, by means of suitable needling processes.

The limitations in the solution proposed by U.S. Pat. No. 4,368,227 are mainly caused by the required use of large quantities of the polyurethane binder, due to the use of very short fibers (≦10 mm) interlaced by means of water needling. Water needling does not necessarily provide a degree of interlacing that enables the use of small amounts of polyurethane binder in the subsequent impregnation phase.

With the proposed solution, on the other hand, mechanical needling is not possible, which would otherwise ensure a higher interlacing between the microfibers and between the layers, since mechanical needling would cause an excessive structural weakening caused by the breakage of the fibers forming the various layers of the composite material.

A limitation in the teachings of U.S. Pat. No 5,112,421, which uses longer fibers (>20 mm) and therefore requires smaller amounts of binder for retaining the fibers, is the requirement for highly twisted yarns for producing fabrics representing the reinforced layer. This is caused by the required overlapping of the single layers, whether microfibrous and not, and by the subsequent needling operations, which lead to the production of an intermediate product characterized by suitable values of thickness and density.

The use of highly twisted yarns has the purpose of preserving these compounds from an excessive structural weakening but, on the other hand, has an effect on the visual appearance of the finished product. Needling density is required to be high and conveys a significant number of "bundles" of fibers having conventional deniers in the proximity of the microporous surface (i.e. the "visible" surface of the final product), which makes the homogeneous appearance of high-quality suede-like artificial leather impossible.

If textile structures could be used with no twisted yarns, the above conveyance phenomena would be limited to single fibers, and the visual and tactile impact would certainly be lower that that due to the presence of said bundles.

BRIEF SUMMARY OF THE INVENTION

In one embodiment of the invention, a process is disclosed for the production of high quality synthetic leather that has a suede-like appearance and that has enhanced mechanical resistance, that is soft and formable, and that is free of the above-described drawbacks and limitations.

In this process, layers are combined to form a composite structure in an upstream phase of the dyeing process, such a combination being performed with a method differing from the previously described method of interlacing fibers by means of needling. The inventive method comprises the preparation of a multilayer intermediate product impregnated with polyurethane, suitable for producing an artificial leather having a visual appearance and tactile characteristics on the reverse side (that is, the side that is not visible in the final application of the product) similar to those of the visible side.

DETAILED DESCRIPTION OF THE INVENTION

Detailed descriptions of embodiments of the invention are provided herein. It should be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

One embodiment of the present invention concerns a process for the preparation of a multilayer intermediate product impregnated with polyurethane, which is useful for the production of a soft synthetic layer with enhanced mechanical resistance and which comprises:

a. producting a microfibrous non-woven intermediate product consisting of microfibers of one or more polymers selected from the group consisting of polyethylene terephthalate, polytrimethylene terephthalate, polybutylene terephthalate, polyacrylonitrile, polyamide;

b. producing an intermediate multilayer product by adhesive coupling, the intermediate multilayer product comprising at least one layer of the above-mentioned non-woven microfibrous intermediate product and at least one layer of a reinforcing textile product; and c. impregnating the multilayer intermediate product with one or more polyurethane solutions, thereby obtaining a multilayer intermediate product impregnated with polyurethane.

The non-woven microfibrous intermediate product is preferably derived from polyethylene terephthalate and is preferably manufactured according to the following process:

i. spinning of a bicomponent fiber, at least one of the component fibers being microfibrous; and ii. preparing a semifinished felt by a mechanical or water needling process, preferably a mechanical process. The semifinished felt normally has density values included within the range of $0.150 \div 0.220$ g/cm$^3$ and unit weights within the range of 550-650 g/m$^2$. Fibers of conventional counts (natural, artificial or synthetic) can be used in the production of felt, alone or mixed with the fibers obtained in step i.

iii. Impregnating the felt according to step 3 of the above-described production method, to produce the intermediate product called "SR".

iv. Dissolving the "sea" component of the bicomponent fibers according to step 4 of the above-described production method, to produce the intermediate product called "D".

Before the above-described step b is performed, the above-mentioned non-woven microfibrous intermediate product "D" is subjected to a longitudinal cutting parallel to the surfaces, to produce an intermediate product called "split D."

The adhesives used in the above-described coupling step b are preferably thermoplastic adhesives, which can be in the form of granules, powder, veil, network, continuous sheet and engraved sheet. A non-limiting example of the coupling conditions consists in the use of an adhesive in laminar form with a veil or network structure, which is hot laminated between the components to be coupled. These thermoplastic adhesives typically have a melting temperature ranging from 60° C., to 150° C., preferably from 80° C. to 120° C.

In a variant of the present embodiment, an adhesive may be in granular form, which is melted and spread with a cylinder engraved on at least one of the surfaces to be coupled, and the multilayer intermediate product is successively calendered. This is an example of hot melt technology.

Adhesives may also be used in the above-described step b, which polymerise after application, or solvent-based adhesives.

The reinforcing textile product of step b is a fabric, either orthogonal or knitted, or non-woven, and may be produced from synthetic and/or artificial and/or natural fibers.

The reinforcing material is selected according to the final use of the suede-like leather or the method of preparation that is employed. For example, if the suede-like leather must guarantee certain mechanical properties, the reinforcing structure is selected from those structures capable of conferring desired properties to the suede-like leather. Furthermore, if the preparation method comprises the longitudinal cutting of the reinforcing structure during one of the method steps, the above structure is selected from three-dimensional structures that can tolerate said longitudinal cutting, to produce two layers having a structure still capable of providing a sufficient mechanical resistance.

Step b can be performed by combining only one of the "D" laminates with the laminated or knitted fabric, thus providing a structure with two layers only. According to another variant of the present embodiment, two laminates "D" may be combined with two or more textile laminates. In this event, the external surfaces are formed by the intermediate products "D".

It should be pointed out that the delamination resistance provided by the adhesive in step b is not necessarily permanent. The adhesive has the only purpose of exerting an adequate adhesive action until the subsequent impregnation in step c with the binding polyurethane matrix, because this polyurethane binder will create the definitive cohesion between the various layers.

Step c of the process relates to impregnating, with one or more polyurethane solutions, the multilayer intermediate product prepared in step b.

The term "polyurethane" is used to describe polymers consisting of flexible segments (soft segments) and rigid segments (hard segments).

The flexible segments may be polymeric portions based on:
polyethers, for example, derivatives of polytetramethyleneglycol diol (PTMG), polyethyleneglycol diol (PEG), polypropyleneglycol diol (PPG);
polyesters, for example, esters of adipic acid such as polyhexamethylene adipate diol (PHA), poly(3-methyl pentamethylene) adipate diol (PMPA) or polyneopentyladipate diol (PNA). Other polyesters can be produced by the opening of cyclic molecules such as caprolactone (thus obtaining polycaprolactone diol, in short PCL);
polycarbonates, for example, polyhexamethyl carbonate diol (PHC), polypentamethylene carbonate diol (PPMC), poly-(3-methyl-pentamethylene carbonate) diol (PMPC), polytetramethylene carbonate diol (PTMC) and mixtures and co-polymers thereof.

The polyesters formed by the co-polymerization of the above mentioned polyethers and polyesters, as well as polyesters-co-polycarbonates obtained by the co-polymerization of polyesters and polycarbonates, may also be used as flexible elements.

The polyols used for the synthesis of the polyurethanes of the below-described examples typically have a average molecular weight number ranging from 1,000 to 3,000, preferably between 1,750 and 2,250.

The rigid segments refer to portions of the polymeric chains formed by the reaction of an organic diisocyanate, for example, methylene-bis-(4-phenyl isocyanate) (MDI) or toluene diisocyanate (TDI) with an amine or glycolic chain. It is well-known, in fact, that the polyurethane synthesis can be performed with diamines, thus obtaining polyurethane-ureas, or with glycols, obtaining, in this latter case, polyurethane in the true sense.

Possible aliphatic diamines that can be used as chain extenders in the production of polyurethane-ureas are ethylene diamine (EDA), 1,3-cyclohexanediamine (1,3-CHDA), 1,4 cyclohexanediamine (1,4-CHDA), isophoronediamine (IPDA), 1,3-propylenediamine (1,3-PDA), 2-methylpentamethylene diamine (MPDM), 1,2-propylene diamine (PDA), and blends thereof. Typical examples of aromatic diamines to be used as chain extenders are 3,3'-dichloro-4,4'-diaminodiphenyl methane, methylene-bis(4-phenyl amine) (MPA), 2,4-diamino-3,5-diethyl toluene, 2,4-diamino-3,5-di(methylthio)toluene. The above aliphatic and/or aromatic diamines may be added as such or developed in situ by reacting the corresponding isocyanate with water. The chain extension in the polyurethanes in the true sense can also be obtained with diols such as ethylene glycol and blends thereof. Finally, the chain extension can also be performed by means of dicarboxylic acids such as malonic, succinic, and adipic acids.

The reactions used for preparing polyurethanes and polyurethane-ureas are typically performed in aprotic inert solvents, such as dimethyl acetamide (DMAc), dimethyl formamide (DMF), and N-methyl pyrrolidone (NMP). The above preparations are well-known to technical experts in the field.

Polyurethane is used, in step c, in the form of a solution in suitable aprotic inert solvents, preferably selected from dimethyl acetamide (DMAc), N,N-dimethyl formamide (DMF), N-methyl pyrrolidone (NMP), even more preferably N,N-dimethyl formamide. As an alternative, step c can be performed using an emulsion or an aqueous dispersion of polyurethane.

The process of the present invention allows a multilayer intermediate product to be produced, in which at least one of the layers has the function of representing the front view surface of the final product and at least one of the other layers has the function of mechanically reinforcing the composite material.

When the intermediate multilayer consists of more than two layers, the process can envisage one or more longitudinal cutting phases, running parallel to the surfaces, analogously to what is carried out in the processes currently in use.

In all embodiments of the present invention, the non-woven layers can consist of microfibers with different dyeabilities, disposed to confer a mélange type effect in the final suede-like leather.

It is a first advantage of the process of the present invention to overcome the limitation in the prior art of using twisted yarns with a high number of twists.

It is a second advantage of the process of the present invention to eliminate the transport phenomena of fibers from the supporting layer to the microfibrous surface, with a relevant improvement in the appearance of the end product.

The product obtained at the end of step c is subjected to the usual operations described in the prior art up to the formation of the end-product, i.e., to the above-described steps 6-9, which are further illustrated with examples in the experimental section.

One of its distinctive characteristics of the final product compared to the prior art is that, in each of the layers forming the product, there is no substantial presence of fibers of the other layers or deriving therefrom.

Further, all the components of the final product are impregnated with a polyurethane binder, which has an uninterrupted structure from one layer to another.

Adding a structure, either woven or knitted, produced according to the process of the present invention, generates an artificial leather of the suede-like type, which has mechanical properties that enable its use in a series of applications without any additional coupling.

A preferred, but not limiting, version of the process in the present embodiment is provided hereunder:

a. spinning a bicomponent fiber, in which at least one of the components is micro fibrous;

b. preparing a semi-finished felt through a mechanical or water needling process, preferably a mechanical process. The semi-finished felt has typical density values within the range of 0.15-0.200 g/cm$^3$ and unit weights within the range of 580-630 g/m$^2$. In the production of the felt, fibers with conventional deniers (natural, artificial or from synthesis) may be used, alone or mixed with fibers obtained in step a above.

c. impregnating the felt, according to step 3 of the above-described production method of microfibrous non-woven fabrics, to obtain the intermediate product called "SR";

d. dissolving the "sea" component of the bicomponent fibers present in the multilayer product, according to step 4 of the above-described production method of microfibrous non-woven fabrics, to obtain the intermediate product called "D";

e. longitudinally cutting the intermediate product "D" parallel to its surfaces, to obtain the intermediate product called "split D";

f. producing a structure with three or more layers by coupling with a suitable adhesive and manufacturing process, in which the two outer laminates are those obtained by cutting the intermediate "D". In a variant of the present method, the combination of only one of the laminates "D" with the woven or knitted laminate may be provided, thus obtaining a two-layered structure only. In another variant, it is possible to combine two laminates "D" with 2 or more textile laminates. In this case, the outer surfaces are formed by the intermediates "D"; and g. Processing the intermediate "D multilayer" obtained in step f above, according to the above-described production method of microfibrous non-woven fabrics in the prior art, in particular, steps 5-9.

The only exception is not performing the cutting phase described in step 7, if the variant based on the construction of a structure with two layers only is used.

It should be pointed out that, to obtain a product uniformly dyed on both surfaces, the chemical nature of the fibers forming the various layers to be coupled must be suitably selected. The following examples are provided for a better understanding of the present embodiment.

EXAMPLES

The following table describes the abbreviations used in the following examples to identify raw materials.

| ABBREVIATION | RAW MATERIAL |
| --- | --- |
| PET | Polyethylene terephthalate |
| PS | Polystyrene |
| PVA | Polyvinyl alcohol |
| PHC | Polyhexamethylenecarbonate glycol |
| PNA | Polyneopentyladipate glycol |
| MDI | 4-4' Diphenylmethane diisocyanate |
| DBA | Dibutyl amine |

Example 1

3-LAYER from split "D"+Knitted Velvet, Coupled by Calendering D and PU

A staple bicomponent fiber is prepared consisting of PET microfibers (0.13-0.15 deniers) in a PS sea, having the following characteristics:

1. Deniers: 3.8 den
2. Length: 51 mm
3. Curlings: about 4-5/cm.

In particular, the fiber consists of 57 parts by weight of PET and 43 parts by weight of PS. The fiber, when observed in section, reveals the presence of 16 PET microfibers englobed in the PS sea.

A felt is prepared with the bicomponent fiber, having a density ranging from 0.150 to 0.200 g/cm$^3$ and a unit weights in the range of 580 to 630 g/m$^2$, by means of mechanical needling.

The needled felt is immersed in a water solution with 20% by weight of polyvinyl alcohol, and is then subjected to drying. After this treatment, the needled felt is immersed in trichloro-ethylene until the complete dissolution of the polystyrene sea of the fibers. The non-woven fabric formed is subsequently dried and an intermediate product is obtained called "semifinished D".

The semifinished D product is then cut longitudinally to obtain two identical laminates.

The two laminates are superimposed, and a knitted fabric made of PET yarns, not cut, having the same thickness of 2.0 mm and without twisted yarns (produced by means of Raschel looms with fineness 22) is inserted between them to produce a three-layered structure.

The velvet used as reinforcing element has a tenacity of 150 N/cm and an elongation-to-break of 55% in a longitudinal direction.

The three layers are adhesively coupled by means of a calender coupling process with a veil thermoplastic adhesive based on a co-polyamide and having a melting range of 110-120° C. A "multilayer D semifinished product" is obtained.

A polyurethane elastomer is prepared separately, in the form of a solution in DMF. In a first step (pre-polymerization), PHC and PNA, both having a molecular weight of 2,000, are reacted at a temperature of 65° C., under stirring, with a MDI in a molar ratio isocyanate/diols of 2.9/1. Three hours after the beginning of the reaction, the pre-polymer thus obtained is cooled to a temperature of 45° C. and diluted with DMF, with a water content of 0.03%, until a 25% solution of pre-polymer having a content of free NCO groups of 1.46%, is obtained.

DBA and water dissolved in DMF are then slowly added, over a period of five minutes, maintaining the temperature at 45° C., so to have a polyurethane-polyurea with a molecular weight equal to 43,000. The reactor, after raising the temperature to 65° C., is maintained under stirring for a further 8 hours obtaining, at the end, a solution of polyurethane polyurea, stable with time, having a viscosity of 24,000 mPa*sec at 20° C. The elastomer solution thus prepared is then diluted with DMF, containing Tinuvin® 622 and Tinuvin® 326, to form a 14% by weight solution. The polymer obtained in solution, when coagulated in water, is capable of generating high porosity structures.

The "multilayer D semifinished product," prepared as described above, is immersed in the solution of the polyurethane elastomer, squeezed by passing it between a pair of rolls and subsequently immersed for one hour in a water bath maintained at 40° C. A coagulated multilayer product is obtained, which is passed into a water bath heated to 80° C. to extract the residual solvent and polyvinyl alcohol. After drying, a composite material is obtained, consisting of two microfibrous external layers and the velvet at the center. This composite material is longitudinally cut at the center into two laminates, each consisting of two layers (cut velvet+microfibrous layer). The laminates thus obtained are subjected to grinding, mainly on the microfibrous surface, to extract the microfibers and to form the nap. The result obtained is a composite material having two layers, one of these is a microfibrous non-woven synthetic fabric called "crude", having an average thickness of 1.10 mm.

The composite material is then jet dyed according to processed used in the art for suede-like leather.

The artificial leather thus obtained has an appearance completely similar to that of already known high quality artificial leather, because fibers belonging to the reinforcing velvet in the microfibrous layer are completely absent. This artificial leather, however, is also different due to its elevated physico-mechanical properties (conferred to the composite material by the velvet used as reinforcement), which make it suitable for use as a cover of stuffed materials in the field of automobile interiors, without any further coupling after the dyeing process. This specific characteristic also provides for a composite material having the two outer surfaces with the same shade of color. The composite material has a tenacity of 130 N/cm and an elongation-to-break of 50% in a longitudinal direction.

Example 2

2-LAYER from Split "D"+"Colorado" Cloth Coupled by Calendaring D and PU

A staple bicomponent fiber is prepared, consisting of PET microfibers (0.13-0.15 deniers) in a PS sea, having the following characteristics:
1. Deniers: 3.8 den
2. Length: 51 mm
3. Curlings: about 4-5/cm.

In particular, the fiber consists of 57 parts by weight of PET and 43 parts by weight of PS. The fiber, when observed in section, reveals the presence of 16 PET microfibers englobed in the PS sea.

A crude felt is prepared with the bicomponent fiber, subjected to needling to form a needled felt having a density ranging from 0.150 to 0.200 g/cm$^3$ and a unit weight within the range of 580 to 630 g/m$^2$.

The needled felt is immersed in a water solution with 20% by weight of polyvinyl alcohol, and is then subjected to drying. After this treatment, the needled felt is immersed in trichloro ethylene until the complete dissolution of the polystyrene sea of the fibers. The resulting non-woven fabric is then dried and an intermediate product is obtained called "semifinished D".

The semifinished D product is then cut longitudinally to obtain two identical laminates.

One of the two laminates is superimposed on a knitted circular textile having a thickness of 0.35 mm, made of PET yarns, to form a two-layered structure.

The knitted fabric has a tenacity of 20 N/cm and an elongation of 60% under a load of 100N.

The two layers are adhesively coupled by means of a calendering coupling process with a veil thermoplastic adhesive based on a co-polyamide; this adhesive is characterized by a melting range of 110-120° C. A "multilayer D semifinished product" is obtained.

A polyurethane elastomer is prepared separately, in the form a solution in DMF. In a first step (pre-polymerization) PHC and PNA, both having a molecular weight of 2,000, are reacted at a temperature of 65° C., under stirring, with MDI in a molar ratio isocyanate/diols of 2.9/1. Three hours after the beginning of the reaction, the pre-polymer thus obtained is cooled to a temperature of 45° C. and diluted with DMF, with a water content of 0.03%, until a 25% solution of pre-polymer having a content of free NCO groups of 1.46%, is obtained.

DBA and water dissolved in DMF are then slowly added, over a period of 5 minutes, maintaining the temperature at 45° C., so as to have a polyurethane-polyurea having a molecular weight equal to 43,000. The reactor, after raising the temperature to 65° C., is maintained under stirring for a further eight hours obtaining, at the end, a solution of polyurethane polyurea, stable with time, having a viscosity of 24,000 mPa*sec at 20° C. The elastomeric solution thus prepared is then diluted with DMF, containing Tinuvin® 622 and Tinuvin® 326, to form a 14% by weight solution. The polymer obtained in solution, when coagulated in water, is capable of generating high porosity structures.

The "multilayer D semifinished product," prepared as described above, is immersed in the solution of the polyurethane elastomer, squeezed by passing it between a pair of rolls and is subsequently immersed for one hour in a water bath maintained at 40° C. A coagulated multilayer product is obtained, which is passed into a water bath heated to 80° C. to extract the residual solvent and polyvinyl alcohol. After drying, a composite material is obtained consisting of the microfibrous layer and knitted textile. The semi-finished product is subjected to grinding, mainly on the microfibrous surface, to extract the microfibers and to form the nap. The result is a composite material having two layers, one of these is a microfibrous non-woven synthetic fabric called "crude", which has an average thickness of 1.10 mm.

The composite material is then jet dyed according to processes known in the art for suede-like leather.

The artificial leather thus obtained has an appearance completely similar to that of already known high quality artificial leather, because fibers belonging to the reinforcing knitted material in the microfibrous layer are completely absent. This artificial leather, however, is different due to its high physico-mechanical properties (conferred to the composite material by the knitted material used as reinforcement), which make it suitable as the cover of stuffed materials in the field of automobile interiors, without requiring any further coupling after the dyeing process. This specific characteristic also allows a composite material to be produced having the two outer surfaces with the same shade of color. The composite material has a tenacity of 140 N/cm and an elongation-to-break of 60% in a longitudinal direction.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A process for the preparation of a multilayer intermediate product impregnated with polyurethane, the process being useful for preparing a soft synthetic leather and comprising:
   a. producing a microfibrous non-woven intermediate product comprising microfibers of one or more polymers selected from the group consisting of polyethylene terephthalate, polytrimethylene terephthalate, polybutylene terephthalate, polyacrylonitrile, and polyamide;
   b. producing an intermediate multilayer product by adhesive coupling, the intermediate multilayer product comprising at least one layer of the non-woven microfibrous intermediate product and at least one layer of a reinforcing textile product, wherein the layers in the intermediate multilayer product are bonded by adhesive; and
   c. impregnating the multilayer intermediate product with one or more polyurethane solutions, causing the multilayer intermediate product to be impregnated with polyurethane.

2. The process according to claim 1, wherein the microfibrous non-woven intermediate product is produced with polyethylene terephthalate (PET) microfibers.

3. The process according to claim 1, wherein the reinforcing textile product is a woven, knitted, or non-woven fabric.

4. The process according to claim 1, wherein the adhesive coupling is performed with a thermoplastic adhesive having a melting range of 60 to 150° C.

5. The process according to claim 4, wherein the adhesive coupling is performed with a thermoplastic adhesive that is co-polyester or co-polyamide based and that has a melting range of 80 to 120° C.

6. The process according to claim 1, wherein the adhesive coupling is performed with a hot-melt process.

7. The process according to claim 1, wherein the adhesive coupling is performed with calendering lamination.

8. The process according to claim 1, wherein the multilayer intermediate product comprises two outer layers of a non-woven material and an inner layer of the reinforcing textile product.

9. The process according to claim 1, wherein the intermediate multilayer product comprises one non-woven layer and one layer of the reinforcing textile product.

10. The process according to claim 1, wherein impregnating comprises immersing the intermediate multilayer product in a solution of one or more polyurethanes and subsequently coagulating the polyurethane.

11. The process according to claim 1, wherein the impregnating comprises immersing the multilayer intermediate product in an emulsion or water dispersion of polyurethane and subsequently coagulating the polyurethane.

12. The process according to claim 1, wherein the non-woven microfibrous intermediate product comprises fibers with a count lower than 1 den.

13. The process according to claim 1, wherein the non-woven microfibrous intermediate product comprises fibers having a different dyeability, the fibers being disposed to provide a mélange effect.

14. The process according to claim 8, wherein impregnating the multilayer intermediate product comprises causing the one or more polyurethane solutions to operate as a binder with an uninterrupted chemical and physical structure between all the layers of the intermediate multilayer product.

15. The process according to claim 1, further comprising the steps of:
impregnating the microfibrous non-woven intermediate product with a binder before the step of producing the intermediate multilayer product; and
removing the binder after the step of impregnating the multilayer intermediate product with the one or more polyurethane solutions.

16. The process according to claim 15, further comprising the step of cutting the microfibrous non-woven intermediate product longitudinally in a direction parallel to upper and lower faces of the microfibrous non-woven intermediate product before the step of producing the intermediate multilayer product by the adhesive coupling.

17. The process according to claim 15, wherein the microfiber comprises two or more polymers coupled one to the other in a sea-island arrangement, further comprising the step of dissolving the island before the step of impregnating the multilayer intermediate product with the one or more polyurethane solutions.

18. The process of claim 1, further comprising the step of dyeing the multilayer intermediate product after the step of impregnating the multilayer intermediate product.

* * * * *